United States Patent
Biggel et al.

(10) Patent No.: US 11,503,796 B2
(45) Date of Patent: *Nov. 22, 2022

(54) DEVICE FOR PRODUCING PROCESSED CHEESE PORTIONS

(71) Applicant: Hochland SE, Heimenkirch (DE)

(72) Inventors: Andreas Biggel, Hergatz (DE); Sebastian Schmidt, Lindau (DE); Richard Bechteler, Heimenkirch (DE); Josef Burger, Leutkirch-Reichenhofen (DE); Thomas Handerer, Heimenkirch (DE)

(73) Assignee: Hochland SE, Heimenkirch (DE)

( * ) Notice: Subject to any disclaimer, the term of this patent is extended or adjusted under 35 U.S.C. 154(b) by 634 days.

This patent is subject to a terminal disclaimer.

(21) Appl. No.: 16/411,874

(22) Filed: May 14, 2019

(65) Prior Publication Data
US 2019/0261592 A1    Aug. 29, 2019

Related U.S. Application Data

(63) Continuation of application No. 15/842,827, filed on Dec. 14, 2017, now Pat. No. 10,321,658, which is a continuation of application No. 13/818,943, filed as application No. PCT/EP2011/062494 on Jul. 21, 2011, now abandoned.

(30) Foreign Application Priority Data

Aug. 25, 2010    (DE) .......................... 1020100355224

(51) Int. Cl.
*A01J 25/04*    (2006.01)
*A01J 25/12*    (2006.01)

(52) U.S. Cl.
CPC ............... *A01J 25/04* (2013.01); *A01J 25/12* (2013.01)

(58) Field of Classification Search
None
See application file for complete search history.

(56) References Cited

U.S. PATENT DOCUMENTS 3,754,803 A * 8/1973 Underwood ........... B65D 81/07
                                                                312/31
3,998,400 A * 12/1976 Gee ....................... B65H 75/245
                                                                242/573.3

(Continued)

*Primary Examiner* — John J Norton
(74) *Attorney, Agent, or Firm* — Robert S. Lelkes; Lelkes IP

(57) ABSTRACT

The invention relates to a device for producing processed cheese portions, comprising a plurality of modules that are arranged successively in the direction of production, in which the processed cheese is formed into a band, cooled, and divided into portions, wherein the modules define a production space through which the processed cheese travels during the production of the processed cheese portions. The production space is enclosed by a spray-proof casing, wherein the casing comprises a frame structure and a plurality of sheet metal elements which are detachably connected to the frame structure, and wherein a sealing hose is arranged between a sheet metal element and the area of the frame structure opposite thereto, and encircles the sheet metal element or the area of the frame structure opposite thereto.

16 Claims, 5 Drawing Sheets

(56) References Cited

U.S. PATENT DOCUMENTS

| | | | | |
|---|---|---|---|---|
| 4,065,026 | A | * | 12/1977 | Williams ............ B60K 15/0406 |
| | | | | 220/304 |
| 4,155,166 | A | * | 5/1979 | Rochow .................. G01F 23/04 |
| | | | | 33/727 |
| 4,993,574 | A | * | 2/1991 | King ...................... B65D 88/14 |
| | | | | 220/1.5 |
| 5,172,917 | A | * | 12/1992 | du Gay ................ F16J 15/3456 |
| | | | | 277/402 |
| 5,623,778 | A | * | 4/1997 | Dunn ...................... G09F 7/002 |
| | | | | 40/574 |
| 5,722,328 | A | * | 3/1998 | Darby .................... B65D 19/06 |
| | | | | 108/53.1 |
| 5,885,404 | A | * | 3/1999 | Kim .................. H01L 21/68735 |
| | | | | 156/345.51 |
| 7,469,509 | B2 | * | 12/2008 | Cripe .................... E06B 3/5481 |
| | | | | 296/146.15 |
| 2007/0048403 | A1 | * | 3/2007 | Thuli ...................... A01K 1/123 |
| | | | | 426/36 |
| 2008/0276925 | A1 | * | 11/2008 | Griswold .............. F24C 15/022 |
| | | | | 126/19 R |

\* cited by examiner

DEVICE FOR PRODUCING PROCESSED CHEESE PORTIONS

CROSS-REFERENCE TO RELATED APPLICATIONS

This application is a continuation of U.S. non-provisional patent application Ser. No. 15/842,827 filed on Dec. 14, 2017, which is a continuation of U.S. patent application Ser. No. 13/818,943 filed on Jan. 8, 2014, which is the US national phase of international application no. PCT/EP2011/062494 filed on Jul. 21, 2011, which claims priority from German patent application no. 102010035522.4 filed on Aug. 25, 2010.

BACKGROUND OF THE INVENTION

Field of the Invention

The invention relates to a device for producing processed cheese portions, comprising a plurality of modules disposed successively in the direction of production, in which the processed cheese is shaped into a strip, cooled and divided into portions, wherein the modules define a production space through which the processed cheese passes during production of the processed cheese portions.

Description of the Related Art

In the production of a foodstuff, constant care must be taken to prevent contamination of the product as it passes through the production system. Foodstuffs that have come in contact with germs or grime are a risk to the manufacturer that cannot be underestimated. These foodstuffs spoil before expiration of the intended shelf life and must be removed from commerce; in addition, they can cause health problems for the consumer if consumed unawares.

Therefore, the production system must be absolutely germ-free in order to produce a hygienically flawless foodstuff. By necessity, production must be interrupted regularly in order to restore the production system to a germ-free state. Valuable production time is lost to cleaning, which is somewhat complicated, particularly when individual components of the system must be removed for this purpose.

In order to minimize the introduction of grime, the production system should be installed in a production space that is as hygienically flawless as possible. In order to perform production in a manner that is truly bacteriologically safe, the system itself must be cleaned and a cleanroom environment is required. Therefore, the production environment has a substantial influence on the frequency of the cleaning cycles. The requirement to maintain entire rooms germ-free is very difficult to implement. This limits the usability of large and open production systems that are known from the production of processed cheese.

The amount of cleaning effort required can be reduced by keeping the system parts that must remain germ-free separate from the rest of the production hall or the system. For example, so-called aseptic filling machines are used in automated beverage bottling. An aseptic filling machine is the actual filling area, which is separated from the rest of the filling system via an enclosure. The enclosure defines an enclosed production space in the immediate vicinity of the filling area, which is separated from the rest of the system. The production space encloses and protects the filling area, and the desired germ-free state is attained via regular cleaning of the outer and inner surfaces thereof.

The effort required to maintain the germ-free state of a production space enclosed in this manner is substantially less compared to that of a filling area that is left open. The cleaning of a production space enclosed in that manner can be carried out, for example, via cleaning-in-place (CIP) using cleaning systems fixedly installed in the enclosure.

Such enclosures are not used in the production of processed cheese portions. The main reason therefor is that a plurality of working steps is required to process processed cheese, all of which require a hygienically flawless environment. The production systems that are used are also substantially larger and have a highly complicated design as a narrowly limited, easily protected filling area for beverage bottles. Instead of flowing through closed and easily cleaned pipelines, the processed cheese to be processed is guided openly across long distances while the strand is formed. In so doing, the processed cheese mass comes into contact, via large areas, with the rollers and belts of the system. In order to ensure a flawless hygienic quality of the processed cheese that is produced, a sub-region of the system as well as the entire production strand would have to be enclosed.

Moreover, the production of processed cheese portions requires repeated intervention by operating personnel. Therefore, the system must always be accessible. In addition, an enclosure should be designed such that cleaning and rinsing agents sprayed in the production space during a CIP are prevented from spraying out of there. However, a sealed enclosure intended for ensuring the germ-free state is not easily opened, nor does said enclosure allow direct access to all the relevant system parts.

The problem addressed by the present application is therefore that of simplifying the production of hygienically flawless processed cheese portions.

BRIEF SUMMARY OF THE INVENTION

This problems is solved by a device having the features of claim 1. Advantageous embodiments are referred to in the dependent claims. A fundamental idea of the invention is to enclose the production space with a spray-proof encapsulation, wherein the encapsulation comprises a frame structure and a plurality of sheet metal elements, which are detachably connected to the frame structure, and wherein a sealing tube is disposed between a sheet metal element and the region of the frame structure opposite thereto and encircles the sheet metal element or the region of the frame structure opposite thereto.

BRIEF DESCRIPTION OF THE SEVERAL VIEWS OF THE DRAWINGS

Various aspects of the device according to the invention are explained, as examples, by reference to the following figures. Shown are

DETAILED DESCRIPTION OF THE INVENTION

Figure 1:
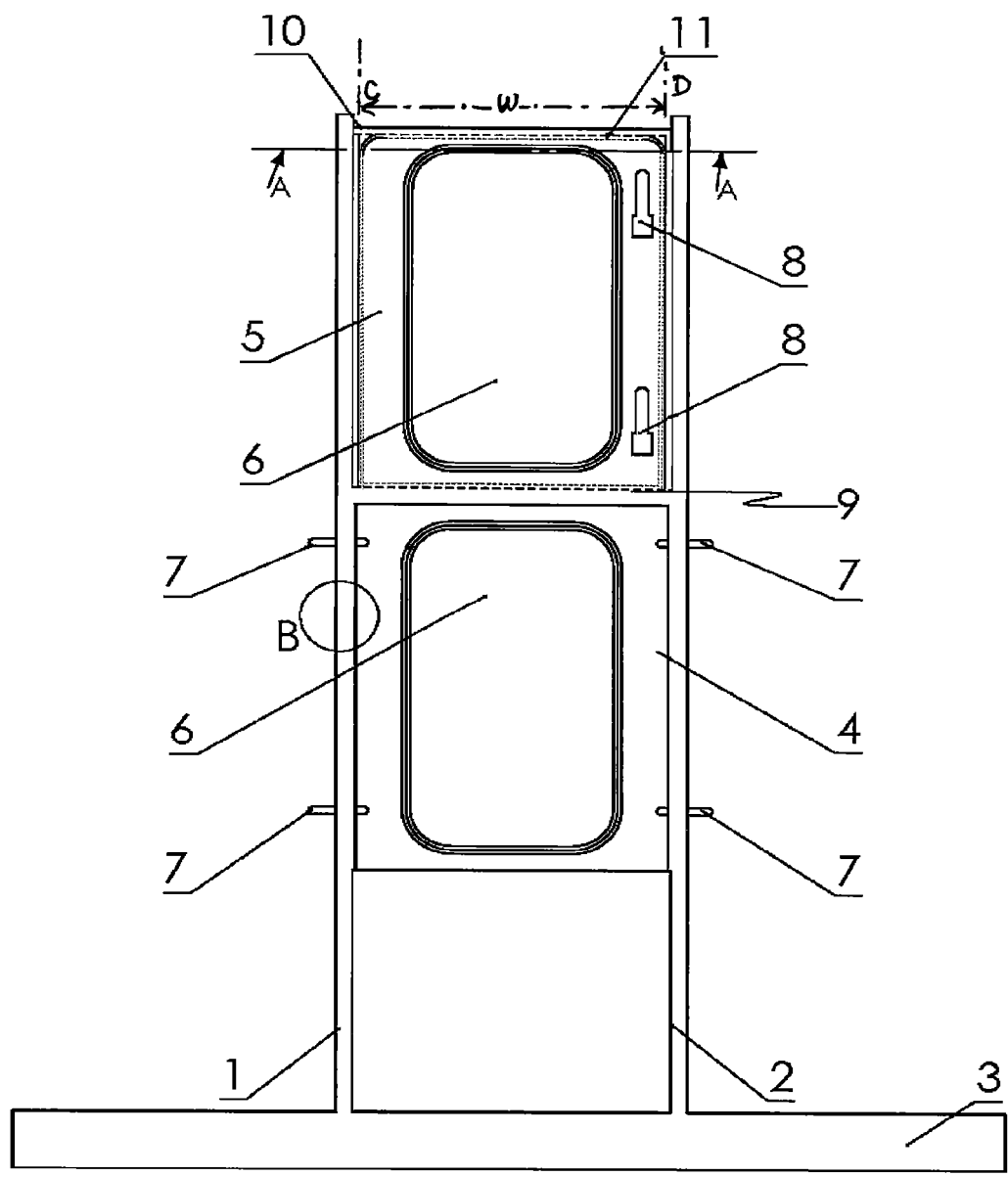
FIG. 1 shows a top view of two sheet metal elements mounted on the frame structure.

The encircling sealing tube is disposed such that, when the sheet metal element is closed, said sealing tube is pressed between the frame structure and the sheet metal element via application of external force. The hollow sealing tube deforms elastically, and therefore the gap between the sheet metal element and the frame structure remains completely closed even under unfavorable conditions, such as the occurrence of vibrations during operation, for example. The production system enclosed in this manner is therefore securely protected against the introduction of grime or bacterial contamination from the outside.

The encircling sealing tube is flexible enough to compensate for potential manufacturing tolerances of the frame structure. Therefore, the frame structure that is provided is not subject to any special requirements, but rather can be assembled from standardized profiles having low tolerances, which are easy to manufacture and assemble. The standardization also makes it easy to adapt the encapsulation to different types of such production systems.

Due to the sheet metal elements that are detachably connected to the frame structure, the individual system elements are easy to access, but the sheet metal element to be opened for this purpose can always be tightly reclosed. Every time the sheet metal elements are closed, the sealing tube is elastically deformed once more and the sealing effect of the tubular seal is restored. The encircling tubular seal provides a high degree of sealing, and therefore the production space is reliably sealed. Additional sealing elements can be omitted. The encapsulation according to the invention therefore fulfills all the hygienic requirements for a germ-free production space. Moreover, the encircling tubular seal, due to the uncomplicated design and installation thereof, allows for simple inspection and cleaning of the seal and for easy replacement thereof.

In particular, the encircling sealing tube is designed as one piece, thereby reducing the seams, which impair the seal integrity. The seams open, in particular, during a temperature-induced expansion of the encapsulation. Depending on the type of processed cheese, the processed cheese mass is heated before shaping to temperatures that clearly exceed 60° Celsius. The tubular seal formed as one piece improves the functional reliability of the seal across a large temperature range.

In order to permit viewing of individual system parts, the sheet metal elements can also be equipped with an installed observation window. This allows for high transparency even when the encapsulation is closed and, therefore, allows for constant visual inspection of the system and the functions thereof during operation.

Preferably, the sealing tube encircling the sheet metal element or the region of the frame structure opposite thereto is designed in the manner of a labyrinth seal. This sealing tube comprises, on the surface thereof, a plurality of longitudinally extending sealing lips or lamellas, which, when the sheet metal element is closed, bear individually against the pressed-on contact surface and each impart a sealing effect. In particular, a fluid located on the tubular seal in the horizontally extending part of the circumferential region is effectively held back. The thusly designed sealing tube also withstands CIP-cleaning carried out at high pressures, even if a jet of cleaning or rinsing agent strikes the seal directly while the system is being sprayed. Therefore, the production system enclosed according to the invention permits the production space to be cleaned easily and quickly, and there is no need to remove components of the system. In addition, fluids spraying out of the encapsulation, which causes contamination of the exterior environment, is effectively prevented.

In a further preferred embodiment, the sheet metal element comprises external bent edges, wherein the bent edges form a receptacle for the sealing tube. If the sheet metal elements themselves form the receptacle for the sealing tube, sheet metal elements of any shape and size can be used without the need to make changes to the sealing receptacle. The bent edge extending on the edges of the sheet metal element forms a receptacle that is precisely matched to the dimensions of the particular sheet metal element. Therefore, the sheet metal element always forms its own sealing receptacle. The step of separately adapting the sealing receptacle if the shape of the sheet metal element is changed is eliminated. In addition, the external bent edges stabilize and stiffen the sheet metal elements.

Preferably, a sheet metal element is swivelably held on the frame structure, and the parts of the frame structure opposite the sheet metal element that is swivelably held on the frame structure comprise a circumferential web, which forms a receptacle for the sealing tube. A sheet metal element that is swivelably mounted on the frame structure is particularly easy to open and allows rapid access to the system parts located behind it. The sheet metal element, which is swiveled to be opened, is held further from the frame structure and, once work has been completed, can be closed simply by being swiveled back. The sealing tube is carried by a web that entirely encircles the parts of the frame structure opposite the sheet metal element. The sealing tube, which has been inserted on the web, in particular, therefore reliably seals the closed sheet metal element.

In a particularly preferred embodiment, the production space is connected to an air treatment system, by way of which treated air can be introduced into the production space. This embodiment makes it possible to use the encapsulated production space largely independently of the air quality of the surrounding premises. The air treatment system supplies the encapsulated production area with a separate atmosphere, so to speak, which is oriented toward germ-free production. The effort required to keep entire production halls germ-free or nearly germ-free is eliminated. Advantageously, a slight overpressure is generated in the interior of the encapsulation, thereby preventing air from entering the production space from the outside.

Preferably, the air treatment system comprises a module for filtering and/or drying and/or cooling the air introduced into the production space. The corresponding modules make it possible to create a climate within the production space that is optimal for processed cheese production. A module for clean room filtering reduces the germ count of the air introduced into the production space. Cooling and/or drying the air prevents condensation water from forming in the production space and suppresses the reproduction rate of any germs that may be present.

In a further preferred embodiment, the air intake of the air treatment system is connected to the production space such that the air flowing through the production space is conducted in a closed circuit. Therefore, the treated air is circulated. Reusing the air in this manner reduces the amount of energy required for the treatment.

Preferably, the air treatment system is integrated into the encapsulation of the production space. In this case, a separate encapsulation of the air treatment system is eliminated, thereby simplifying the design of the production system. The integration also allows the air treatment system to be integrated into the CIP. Therefore, CIP cleaning of the system comprises all the components that are essential to maintain a germ-free state of the production space.

FIG. 1 shows a part of a frame structure having two vertical supports 1, 2, which are oriented parallel to one another and have an opening therebetween having vertical boundaries C and D, respectively, defining a width W of the opening. The two supports 1, 2 are held by a horizontal base support 3 of the frame structure. Two sheet metal elements 4, 5, having faces 4A and 5A, respectively, which are mounted on the supports 1, 2 and support 1, respectively, are disposed between the supports 1, 2. Both sheet metal elements comprise a central observation window 6, which permits inspection of the production system located behind said observation window without the need to open the encapsulation. The sheet metal element 4 is detachably connected to the supports 1, 2. Four pins 7 routed into the supports 1, 2, namely two per support, hold the sheet metal element 4 on the frame structure. A tubular seal held in outer bent edges of the sheet metal element is elastically deformed between the sheet metal element 4 and the frame structure. The tubular seal is located on the two supports 1 and 2, and on a support that connects said supports, if present. The circumferential tubular seal seals the sheet metal element 4 completely with respect to the frame structure.

The sheet metal element 5 is swivelably mounted on the support 1 and, in the closed state, is sealed with respect to the supports 1 and 2 and a transversely oriented support 9, which connects said supports. In the view shown in FIG. 1, the transversely oriented support 9 is hidden by the sheet metal element 5. Two locks 8, which can be locked on the support 2, hold the swivelable sheet metal element 5 in the closed position thereof. The sealing of the sheet metal element 5 is explained in greater detail in FIG. 2.

Figure 2:
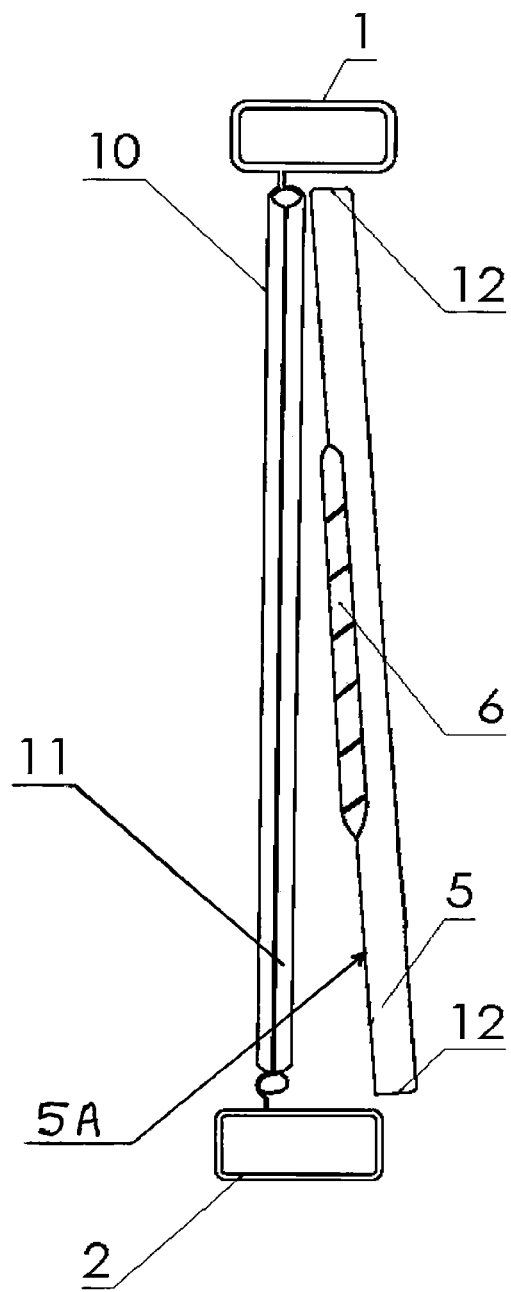
FIG. 2 shows a sectional drawing along the line A-A of FIG. 1.

FIG. 2 shows a sectional drawing along the line A-A of FIG. 1. The sheet metal element 5, which is held by a non-illustrated hinge and which comprises an observation window 6, is shown in FIG. 2 in an angled, i.e. slightly opened position. The supports 1, 2 of the frame structure have a hollow profile and are adapted to support a web 10 for supporting a hollow tubular seal 11 for sealing the swivelably mounted sheet metal element 5. A hollow tubular seal 11 is slid onto the web 10. The web continues on the transversely oriented support 9, which is not shown here, and therefore said web completely encircles the opening of the frame structure formed between the supports on the inner side of the frame structure. If the sheet metal element 5 is swiveled toward the frame structure, the sealing tube 11 is elastically deformed between the web 10 and the outer edge of the sheet metal element 5 and completely seals the gap between the frame structure and face 5A of the sheet metal element 5. External bent edges 12 facing away from the frame structure stabilize the sheet metal element and ensure uniform contact pressure of the sheet metal element against the sealing tube 11.

Figure 3:
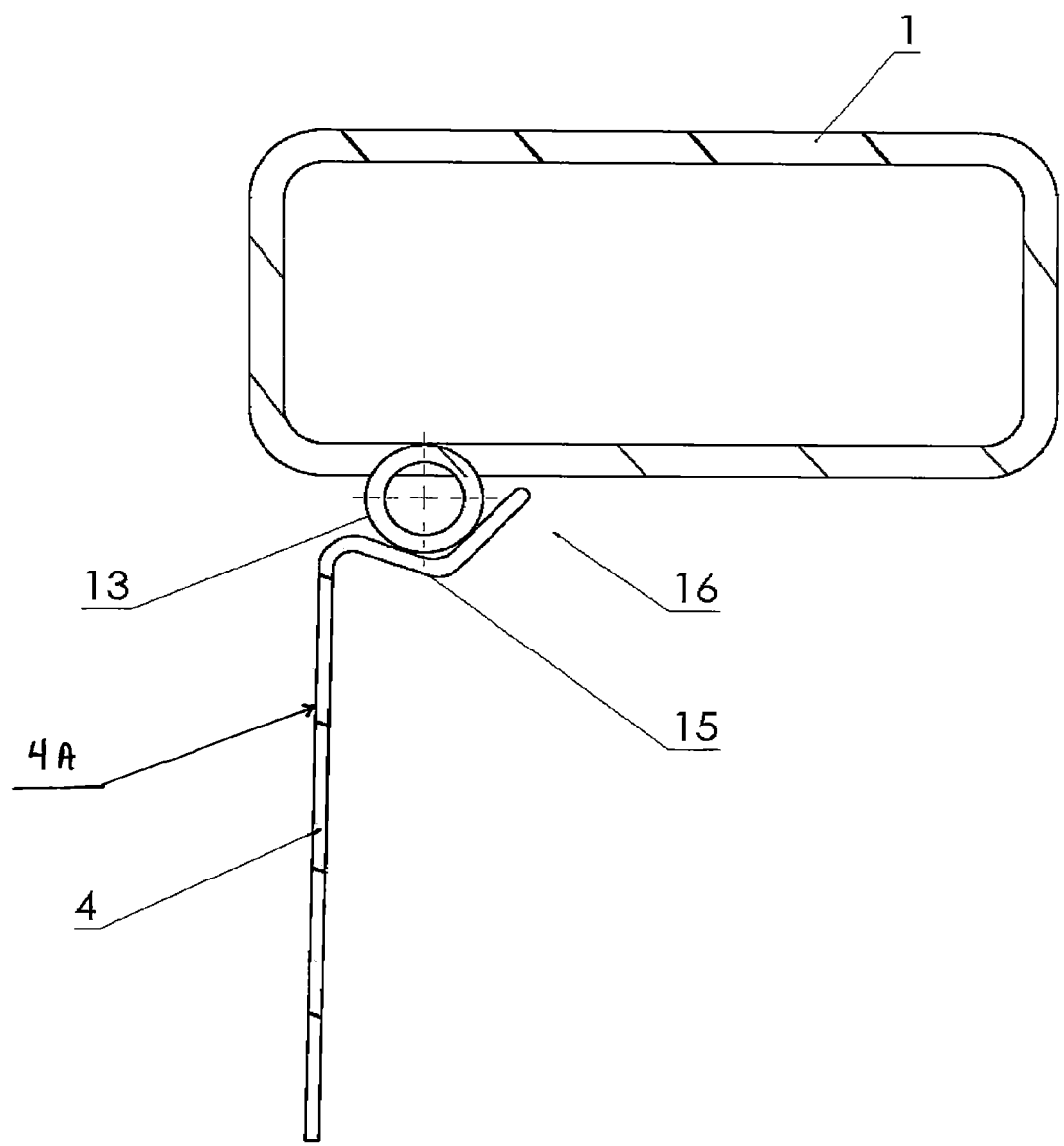
FIG. 3 shows a sectional drawing through the region of FIG. 1 labelled "B"

FIG. 3 shows a sectional drawing through the region of FIG. 1 labelled "B". A hollow tubular seal 13 bears against the hollow support 1. The sheet metal element 4 has an angled bent edge 15 on the outer edge thereof having a face 4A, which forms a seal receptacle 16 for the sealing tube 13 encircling the sheet metal element 4.

If a transversely extending support 9 is not provided between the successive sheet metal elements 4 and 5, as shown in FIG. 1, the swivelably mounted sheet metal element 5 overlaps the detachably fastened sheet metal element 4. In the region of overlap, the two sheet metal elements form a fold, which extends underneath both said sheet metal elements. The metal webs, which are designed in the manner of a labyrinth seal, prevent fluid from escaping from the enclosure, and so an additional seal can be omitted.

Figure 4:
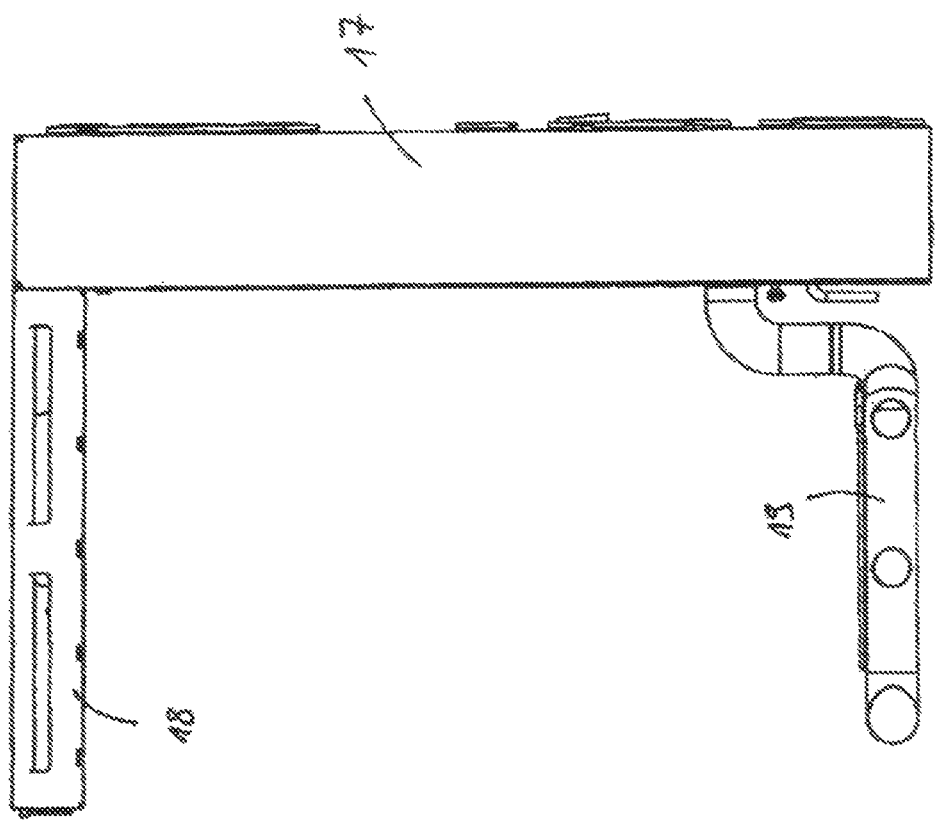
FIGS. 4 and 5 show an exemplary embodiment of an air treatment system according to the example.
Figure 5:
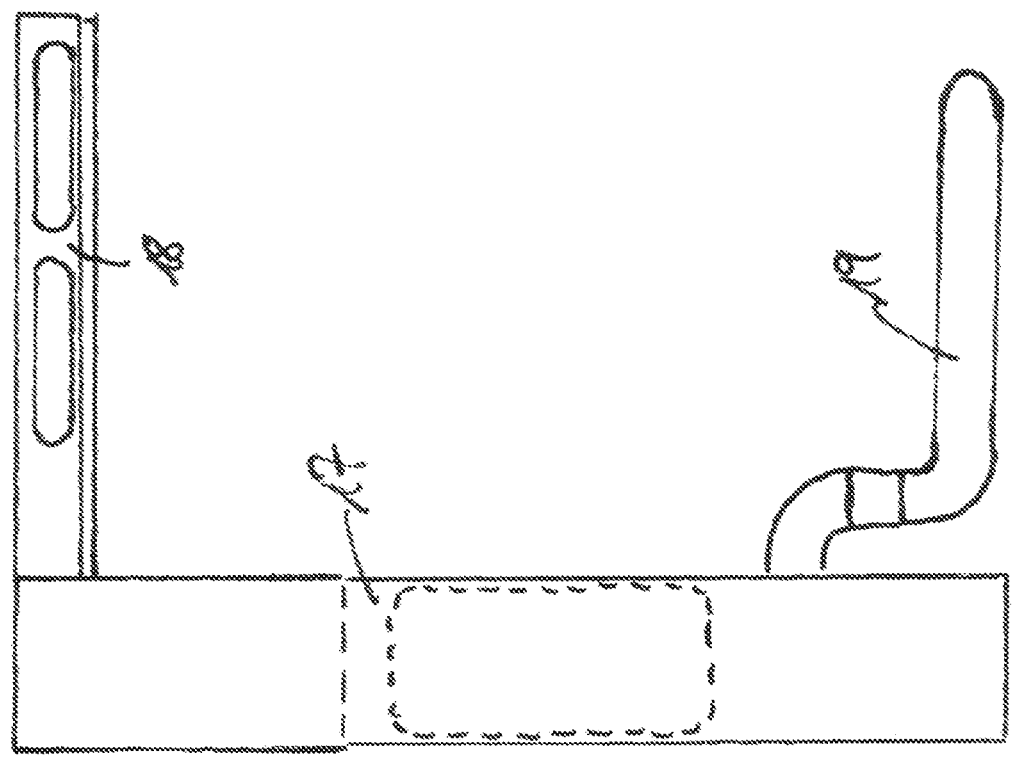

FIGS. 4 and 5 show an air treatment system 17 having inflowing 18 and outflowing 19 air conduction. The enclosed air treatment system 17 comprises a plurality of modules, in which the air conducted therethrough is dried and held at a steady temperature, and comprises a collecting device for condensation water that is discharged.

The invention claimed is:

1. A device for producing processed cheese portions, comprising:
   (a) a production space through which processed cheese passes in a direction of production during production of the processed cheese portions and
   (b) a spray-proof encapsulation that encloses the production space;
   wherein
   the spray-proof encapsulation comprises a frame structure including a frame member, a panel-shaped sheet metal element carried by the frame structure and detachably connected to the frame member to enclose the production space, and a sealing element;
   the panel-shaped sheet metal element comprises an angled bent edge disposed along an outer perimeter of the panel-shaped sheet metal element;
   the frame member is disposed parallel with, and proximal to, the angled bent of the panel-shaped sheet metal element;
   the angled bent edge forms a receptacle for the sealing element facing the frame member, wherein the receptacle faces in a direction parallel to the plane defined by the panel-shaped sheet metal element; and
   the sealing element is carried within the receptacle and sealingly engages the frame member to form a seal between the panel-shaped sheet metal element and the frame member.

2. The device of claim 1, wherein the angled bent edge, in profile, forms a trough that defines the receptacle for the sealing element and holds the sealing element in a position offset from the plane defined by the panel-shaped sheet metal element.

3. The device of claim 2, wherein the trough has a V-shape.

4. The device of claim 1, wherein the panel-shaped sheet metal element comprises a window.

5. The device of claim 1, wherein the sealing element is a tubular sealing member that is flexible and elastically deformable.

6. The device of claim 1, wherein the angled bent is disposed around the outer perimeter of the panel-shaped sheet metal element.

7. The device of claim 6, wherein the sealing element extends around the outer perimeter of the panel-shaped sheet metal element.

8. The device of claim 1, wherein the panel-shaped sheet metal element is detachably connected to the frame structure by a pin that releasably secures the panel-shaped sheet metal element to the frame member.

9. The device of claim 8, wherein the frame structure, including the frame member, defines an opening into the production space, the panel-shaped sheet metal element at least partly covers the opening, and the sealing element at least partly seals the opening.

10. A spray-proof encapsulation adapted to enclose a production space having a plurality of cheese-processing modules through which processed cheese passes in a direction of production during production of processed cheese portions, the spray-proof encapsulation comprising:

a frame structure including a frame member, a panel-shaped sheet metal element carried by the frame structure and detachably connected to the frame member to enclose the production space, and a sealing element;

wherein the panel-shaped sheet metal element comprises an angled bent edge disposed along an outer perimeter of the panel-shaped sheet metal element;

wherein the frame member is disposed parallel with, and proximal to, the angled bent of the panel-shaped sheet metal element;

wherein the angled bent edge forms a receptacle for the sealing element, wherein the receptacle faces the frame member in a direction parallel to the plane defined by the panel-shaped sheet metal element; and wherein the sealing element is carried within the receptacle and sealingly engages the frame member to form a seal between the panel-shaped sheet metal element and the frame member.

11. The device of claim 10, wherein the angled bent edge, in profile, forms a trough that defines the receptacle for the sealing element and holds the sealing element in a position offset from the plane defined by the panel-shaped sheet metal element.

12. The device of claim 11, wherein the trough has a V-shape.

13. The device of claim 10, wherein the sealing element is a tubular sealing member that is flexible and elastically deformable.

14. The device of claim 10, wherein the angled bent edge is disposed around the outer perimeter of the panel-shaped sheet metal elementface, and the sealing element extends around the outer perimeter of the panel-shaped sheet metal element.

15. The device of claim 10, wherein the panel-shaped sheet metal element is detachably connected to the frame structure by a pin that releasably secures the panel-shaped sheet metal element to the frame member.

16. The device of claim 10, wherein the frame structure, including the frame member, defines an opening into the production space, the panel-shaped sheet metal element at least partly covers the opening, and the sealing element at least partly seals the opening.

* * * * *